(12) United States Patent
Ishikawa

(10) Patent No.: US 7,576,658 B2
(45) Date of Patent: Aug. 18, 2009

(54) WIPER CONTROL DEVICE FOR VEHICLE

(75) Inventor: Junichi Ishikawa, Kariya (JP)

(73) Assignee: Denso Corporation, Kariya, Aichi-Pref. (JP)

( * ) Notice: Subject to any disclaimer, the term of this patent is extended or adjusted under 35 U.S.C. 154(b) by 290 days.

(21) Appl. No.: 11/589,747

(22) Filed: Oct. 31, 2006

(65) Prior Publication Data

US 2007/0096560 A1     May 3, 2007

(30) Foreign Application Priority Data

Nov. 1, 2005     (JP) ............... 2005-318682

(51) Int. Cl.
*G08B 21/00* (2006.01)

(52) U.S. Cl. ............... 340/602; 15/250.001; 73/170.17; 296/190.1

(58) Field of Classification Search ............... 340/602, 340/441, 466; 15/250.001, 220.1, 103, 214, 15/232, 256.36; 296/190.1; 307/9.1; 318/DIG. 2
See application file for complete search history.

(56) References Cited

U.S. PATENT DOCUMENTS

| | | | | |
|---|---|---|---|---|
| 4,131,834 A | * | 12/1978 | Blaszkowski | ............... 318/483 |
| 4,317,073 A | * | 2/1982 | Blaszkowski | ............... 318/483 |
| 5,187,383 A | * | 2/1993 | Taccetta et al. | ............ 307/10.8 |
| 6,768,422 B2 | * | 7/2004 | Schofield et al. | ............ 340/602 |
| 7,239,231 B2 | * | 7/2007 | Tsukamoto | ................. 340/438 |
| 2005/0206511 A1 | * | 9/2005 | Heenan et al. | ............... 340/438 |

FOREIGN PATENT DOCUMENTS

JP     2002-211363     7/2002

* cited by examiner

*Primary Examiner*—George A Bugg
(74) *Attorney, Agent, or Firm*—Nixon & Vanderhye PC

(57) ABSTRACT

A wiper control device for a vehicle with a wiper includes a day/night detecting device for detecting whether the vehicle is in day-like or night-like conditions. The device also includes a moisture detection device that detects a quantity of moisture on the vehicle and a controlling device that controls the wiping action of the wiper based on a wiping sensitivity to the quantity of moisture detected. The controlling device adjusts the wiping sensitivity between night-like wiping sensitivity and day-like wiping sensitivity. The controlling device adjusts wiping sensitivity to night-like wiping sensitivity when the day/night detecting device detects night-like conditions and to day-like wiping sensitivity when the day/night detecting device detects day-like conditions. Additionally, when the day/night detecting device detects a change between day-like and night-like conditions, the controlling device delays switching between night-like and day-like wiping sensitivity for a predetermined delay time.

14 Claims, 7 Drawing Sheets

US 7,576,658 B2

WIPER CONTROL DEVICE FOR VEHICLE

CROSS REFERENCE TO RELATED APPLICATION

The following is based on and claims priority to Japanese Patent Application No. 2005-318682, filed on Nov. 1, 2005 and is hereby incorporated by reference in its entirety.

FIELD

The following relates to a vehicle wiper control device and, more specifically, relates to a vehicle wiper control device that controls the wiping action of a wiper depending on whether day-like or night-like conditions of the vehicle are detected.

BACKGROUND

Vehicle wiper control devices have been proposed in which wiping movement is controlled depending on the driving environment. More specifically, wiper control devices have been proposed in which wiping movement is automatically controlled based on the light levels (e.g., nighttime light and daytime light) and precipitation (e.g., rain, snow, sleet, etc.) affecting the vehicle.

For instance, Japanese Patent Publication No. 2002-211363A discloses such a system. At nighttime (i.e., lower exterior light levels), raindrops on the windshield can significantly impair the driver's ability to see because the raindrops diffusely reflect the light from the headlamps of approaching vehicles, etc. Thus, in the device of Japanese Patent Publication No. 2002-211363A, the exterior light level (i.e., whether it is daytime or nighttime) is determined based on a switching signal from a light switch. If it is nighttime (i.e., lower light levels), the wipers wipe more frequently than if it is daytime (i.e., higher light levels) for the same amount of raindrops on the windshield. Also, if the headlamps of the corresponding vehicle are in high beam mode, it is assumed that there are no approaching vehicles. Thus, even if low exterior light levels are detected (i.e., if it is nighttime), wiping frequency is reduced as compared with cases in which the headlamps are set in low beam mode.

However, these conventional wiper systems have certain problems. For instance, when a wiper is controlled based on a quantity of raindrops on the windshield, the sensitivity is adjusted if low light levels are detected so that wiping action is more likely to be initiated. When the vehicle enters a covered area of a road (e.g., when the vehicle enters a tunnel), rain stops hitting and sticking to the windshield, and it is desirable that the wiping be stopped as soon as possible. However, in this situation, the system will likely detect lower light levels, the sensitivity for controlling the wiper's wiping action is switched to lower-light sensitivity, and the wiper becomes more likely to perform wiping action. Thus, there can be a time delay before stopping the wiping action.

Also, when the vehicle exits a covered area and starts running on an uncovered road, raindrops will be detected on the windshield, and it becomes desirable to start wiping as soon as possible to improve the driver's view of the road. However, in this situation, the system will likely detect higher light levels, the sensitivity for controlling the wiper's wiping action is switched to higher-light sensitivity, and wiping action can be delayed.

SUMMARY OF THE INVENTION

A wiper control device for a vehicle with a wiper is disclosed. The device includes a day/night detecting device for detecting whether the vehicle is in day-like conditions and whether the vehicle is in night-like conditions. The device also includes a moisture detection device that detects a quantity of moisture on the vehicle. Furthermore, the device includes a controlling device that controls the wiping action of the wiper based on a wiping sensitivity to the quantity of moisture detected by the moisture detection device. The controlling device adjusts the wiping sensitivity between night-like wiping sensitivity and day-like wiping sensitivity. Also, the controlling device adjusts wiping sensitivity to night-like wiping sensitivity when the day/night detecting device detects night-like conditions, and the controlling device adjusts wiping sensitivity to day-like wiping sensitivity when the day/night detecting device detects day-like conditions. A wiping action of the wiper is more likely to be performed at night-like wiping sensitivity as compared to at day-like wiping sensitivity. Additionally, when the day/night detecting device detects a change between day-like and night-like conditions, the controlling device delays switching between night-like and day-like wiping sensitivity for a predetermined delay time.

DETAILED DESCRIPTION OF PREFERRED EMBODIMENT

Hereafter, description will be given to several embodiments of a wiper control device for a vehicle. Referring initially to the embodiment of FIG. 1, the wiper control device includes a day/night detecting device 1. The day/night detecting device 1 detects whether the vehicle is in day-like conditions (i.e., higher light level conditions) and whether the vehicle is in night-like conditions (i.e., lower light level conditions). The day/night detecting device 1 also outputs a day-like signal when day-like conditions are detected, and the day/night detecting device 1 outputs a night-like signal when night-like conditions are detected. The day/night detecting device 1 can be of any suitable type, and can detect the day-like and night-like conditions in any suitable fashion. For instance, in one embodiment, the day/night detecting device 1 utilizes the setting of the headlamps, such that when the headlamps are energized, the day/night detecting device 1 detects night-like conditions, and such that when the headlamps are turned off, the day/night detecting device 1 detects day-like conditions. In another embodiment, the day/night detecting device 1 includes a light sensor that directly detects the amount of light (e.g., solar radiation) affecting the vehicle for determining whether day-like or night-like conditions exist.

Figure 2:
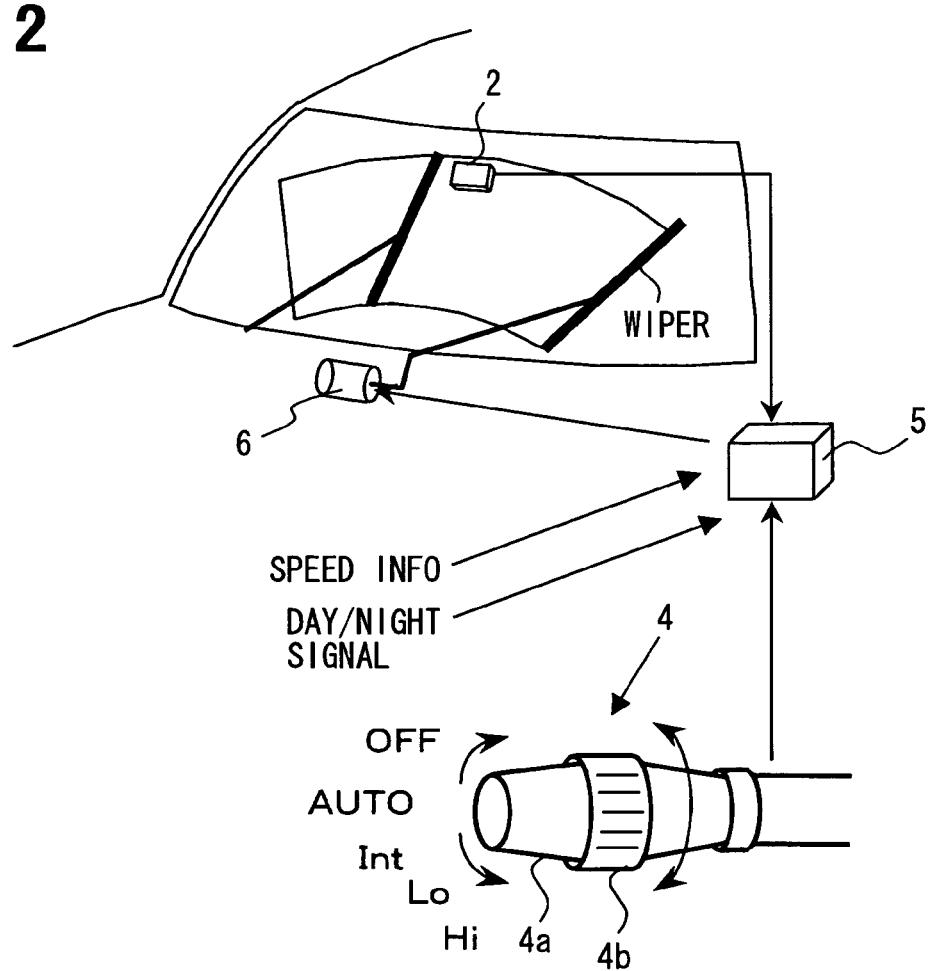
FIG. 2 is a schematic illustration of the vehicle wiper control device of FIG. 1 mounted in a vehicle.

The wiper control device also includes a moisture sensor 2. The moisture sensor 2 detects whether moisture is on the vehicle. For instance, in one embodiment, the moisture sensor 2 detects whether rain is on the windshield of the vehicle. Furthermore, in one embodiment, the moisture sensor 2 detects the quantity of raindrops on the windshield. As illustrated in FIG. 2, for example, the moisture sensor 2 is coupled to the vehicle above the windshield within the vehicle compartment so that it does not hinder the driver's vision.

Figure 3:
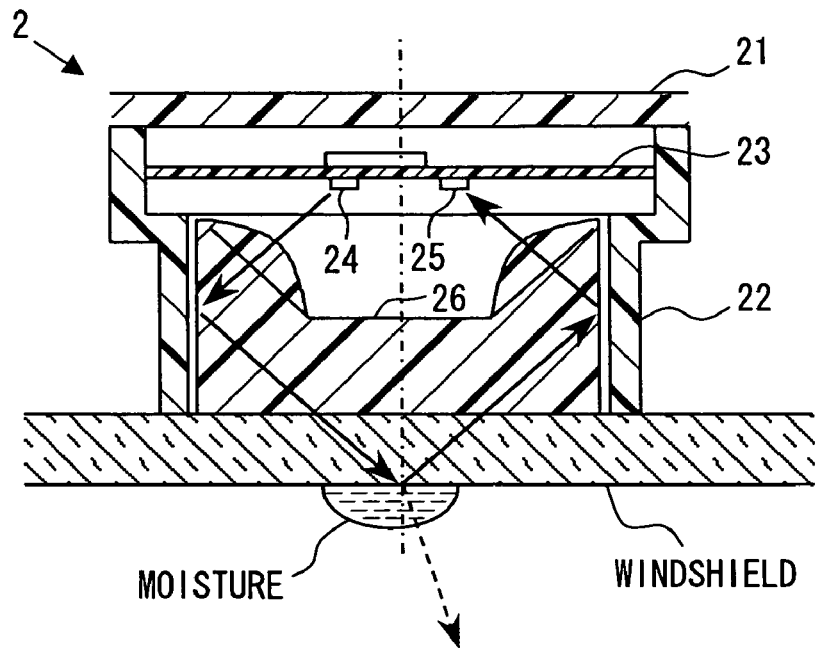
FIG. 3 is a sectional view of a moisture detection device of the vehicle wiper control device.

In one embodiment, the optical moisture sensor illustrated in FIG. 3 is used for the moisture sensor 2. The optical moisture sensor 2 guides emitted light from a light emitting device (LED) 24 to the windshield using a prism 26. The sensor 2 also receives reflected light, reflected by the windshield, by a light sensitive device 25 (e.g., photodiode) through the prism 26. The sensor also includes a circuit board 23, on which are mounted the above-mentioned light emitting device 24, the light sensitive device 25, and electronic components such as processing circuits. The sensor 2 further includes a base 22 and a cover 21, and the above-mentioned circuit board 23 and prism 26 and the like are held and housed in the sensor 2. In the moisture sensor 2, substantially all of the emitted light from the light-emitting device 24 is reflected by the windshield when there is no moisture (e.g., raindrops) sticking to the outside surface of the windshield. When moisture is present on the outside surface of the windshield, the emitted light permeates the windshield through the moisture as indicated by broken line in FIG. 3.

Figure 4:
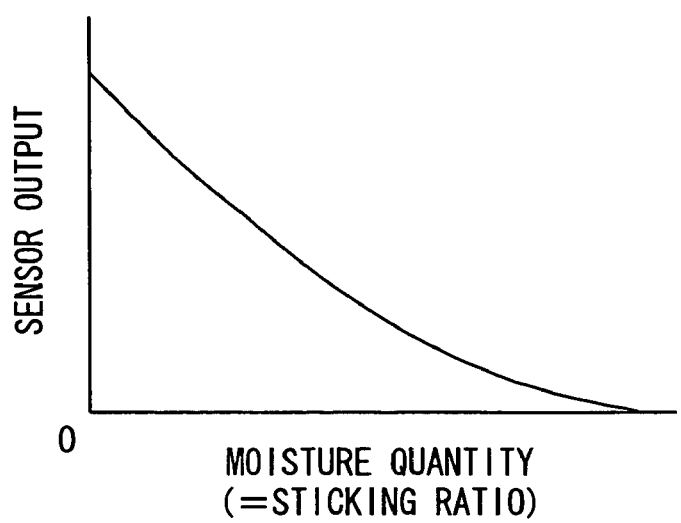
FIG. 4 is a graph illustrating the output characteristics of the moisture detection device.

Therefore, as the ratio of the area where moisture is present to the area in the windshield where the emitted light is reflected increases, the emitted light that permeates the windshield increases. As the result, the moisture sensor 2 exhibits the output characteristics illustrated in FIG. 4, for example. That is, the sensor output (i.e., the amount of light received by the light sensitive device) is reduced with increase in moisture sticking ratio, which can be considered to be equivalent to quantity of moisture on the vehicle. Since the optical moisture sensor 2 has sensor output characteristics that vary according to a quantity of moisture, as mentioned above, the quantity of moisture can be detected from the sensor output.

It will be appreciated that the rain sensor 2 can be of any suitable type and is not limited to the above-mentioned optical moisture sensor. For instance, a capacitance type moisture sensor may be used having a capacitance that varies according to the quantity of moisture. Furthermore, the quantity of moisture may be detected by using a camera and an image processing circuit that performs image processing.

The wiper control device further includes a vehicle speed detecting device 3. The speed detecting device 3 includes a speed sensor that detects the running speed of the vehicle. The speed detecting device 3 computes the running speed of the vehicle based on a detection signal from the speed sensor, and outputs the speed detecting device 3 outputs a signal that correlates to the detected vehicle speed.

Additionally, the wiper control device includes a mode/sensitivity switch 4. In one embodiment, the switch 4 is a wiper switch as illustrated in FIG. 2. The mode/sensitivity switch 4 includes a mode switch 4a that outputs mode signals to a controller 5. The mode signal indicates the various operation modes of the wiper, including stop (OFF), auto mode (AUTO), and manual mode (Int, Lo, Hi). This mode/sensitivity switch 4 also includes a sensitivity adjustment switch 4b. When auto mode is selected, the driver can change the wiping frequency (i.e., number of times of wiping per unit time) of the wiper relative to a quantity of moisture on the vehicle.

The controller 5 determines the operation mode and wiping frequency of the wiper based on signals from the above-mentioned day/night detecting device 1, moisture sensor 2, vehicle speed detecting device 3, and mode/sensitivity switch 4. To drive the wiper with the predetermined wiping frequency, the controller outputs a driving signal from a wiper motor driver 5a to a wiper motor. As a result, the wiper motor 6 is actuated and the wiping action of the wiper is performed.

In one embodiment, automatic wiping action of the wiper occurs when there is a threshold amount of moisture on the windshield. In other words, the controller 5 controls the wiping action of the wiper based on a wiping sensitivity to the quantity of moisture detected by the moisture sensor 2. The threshold amount is reduced when night-like conditions are detected (i.e., the wiping sensitivity is changed to night-like wiping sensitivity) such that wiping is more likely to occur when night-like conditions are detected. In comparison, this threshold is increased when day-like conditions are detected (i.e., the wiping sensitivity is changed to day-like wiping sensitivity) such that wiping is less likely to occur when day-like conditions are detected. In other words, the wiping sensitivity of the system is changed according to whether day-like conditions or night-like conditions are detected. Generally, when the day/night detecting device 1 detects a change between day-like and night-like conditions, the controller 5 delays switching between night-like and day-like wiping sensitivity for a predetermined delay time. This allows for better wiping performance of the wiper, especially, for instance, when entering and exiting a covered portion of the road (e.g., a tunnel).

Figure 1:
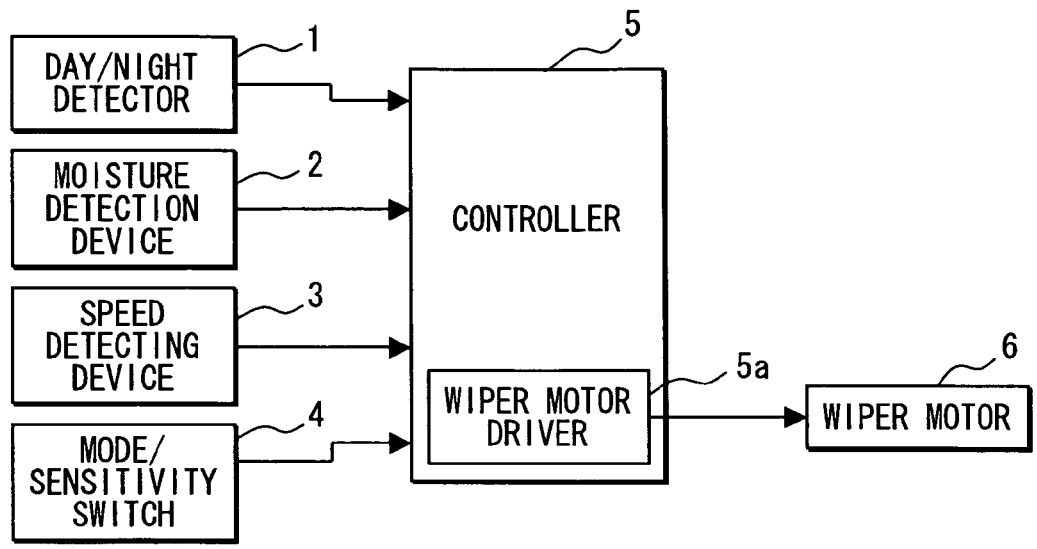
FIG. 1 is a schematic illustration of one embodiment of a vehicle wiper control device.

In the embodiment illustrated in FIG. 1, the controller 5 is so constructed that it incorporates the wiper motor driver 5a. It will be appreciated that these members may be separate from each other. Further, the wiper control device may be so constructed such that the moisture detection device 2 and the controller 5 are integrated with each other.

Figure 5:
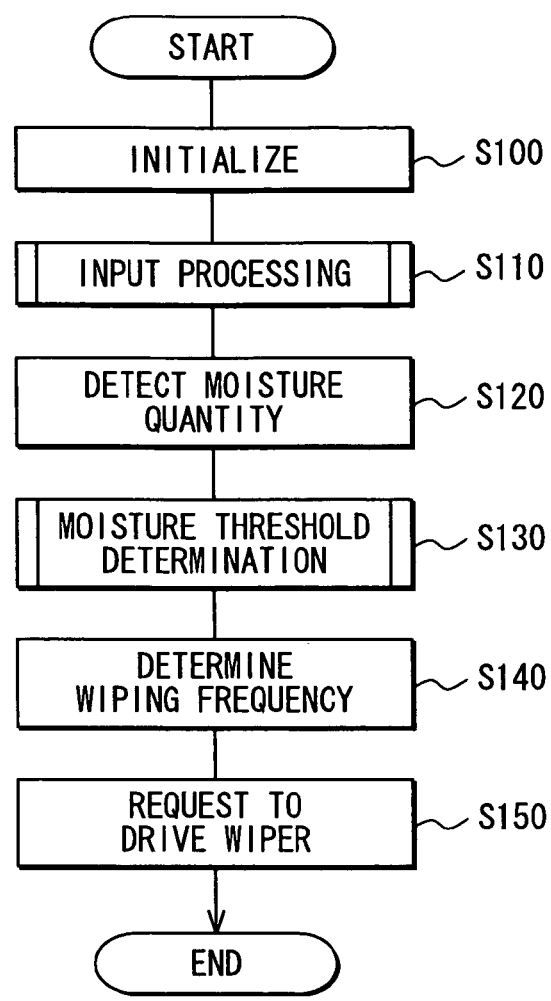
FIG. 5 is a flowchart illustrating one embodiment of the operation of the vehicle wiper control device.

Detailed description will be given to wiper wiping action control carried out when auto mode is selected in the wiper control device, with reference to the flowcharts in FIG. 5 to FIG. 8. FIG. 5 illustrates the overall operation of the wiper control device. First, in step S100 in FIG. 5 initialization processing is carried out to clear various counters and flags in the controller 5. At Step S110, input processing occurs for inputting various signals as will be described with reference to FIG. 6.

Figure 6:
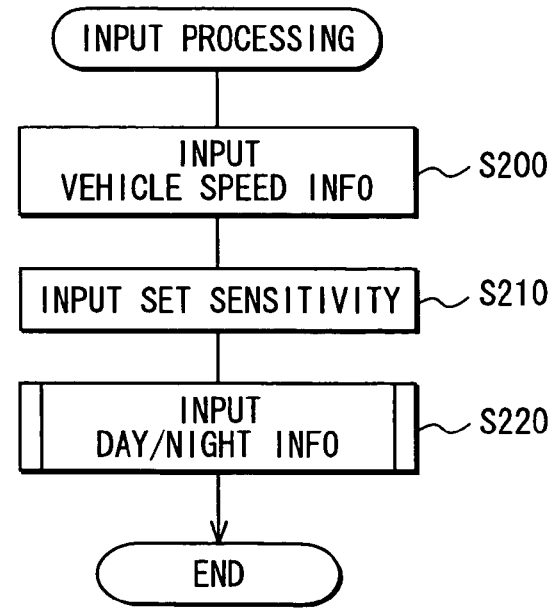
FIG. 6 is a flowchart illustrating a subroutine for operating the vehicle wiper control device.

As shown in FIG. 6, the input processing begins in step S200, in which vehicle speed information is inputted based on an output signal from the vehicle speed detecting device 3. Then, in step S210, a sensitivity set by the driver is inputted based on a signal from the sensitivity adjustment switch 4b of the mode/sensitivity switch 4. Next, in step S220, day/night information is inputted based on an output signal from the day/night detecting device 1. Step S220 is illustrated in more detail in FIG. 7.

Figure 7:
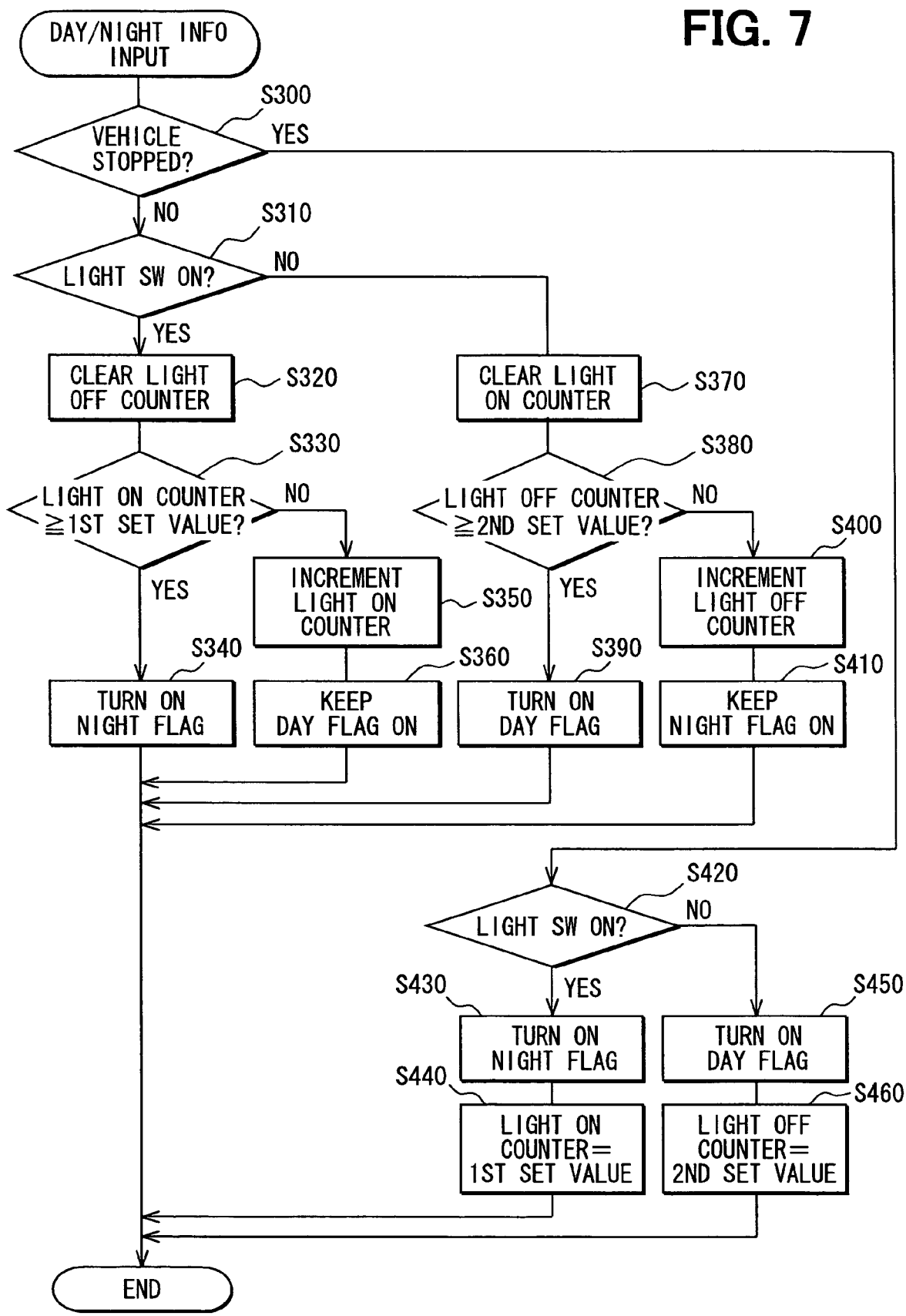
FIG. 7 is a flowchart illustrating a subroutine for operating the vehicle wiper control device.

As shown in FIG. 7, the day/night detection begins at Step S300, in which it is determined whether the vehicle is below a predetermined speed based on the vehicle speed information. When the vehicle speed information indicates that the vehicle is below the predetermined speed (e.g., stopped or substantially stopped), it is determined that the vehicle is at a stop. When, it is determined that the vehicle is stopped, the subroutine proceeds to the processing of step S310.

The day/night detecting device 1 outputs whether the light switch is on or off as day/night information. If the day/night detecting device 1 detects night-like conditions, the light switch is on, and if day-like conditions are detected, the light switch is off. Thus, it is determined at step S310 whether or not the light switch has been turned on. In other words, at step S310, it is determined whether the vehicle is in night-like conditions or day-like conditions based on the whether the light switch is on or off. When, step S310 is answered affirmatively (i.e., the light switch is on), the subroutine of FIG. 7 proceeds to step S320.

In step S320, a LIGHT OFF counter is cleared. The LIGHT OFF counter counts the time that has lapsed since the light switch was turned off. Therefore, when it is determined at Step S310 that the light switch has been turned on, the LIGHT OFF counter is cleared at Step S320 in preparation for the next switching of the light switch from on to off.

Next, in Step S330, it is determined whether the count value of a LIGHT ON counter is greater than or equal to a first set value. The LIGHT ON counter counts the time that has lapsed since the light switch was turned on. When step S330 is answered affirmatively, the subroutine of FIG. 7 proceeds to Step S340. In step S340, a night flag is turned on indicating that the vehicle is in night-like conditions. However, if step S330 is answered negatively, the subroutine of FIG. 7 proceeds to step S350. In step S350, the count value on the LIGHT ON counter is incremented, and the subroutine proceeds to step S360. In step S360, the day flag is kept on indicating that the vehicle is in day-like conditions.

Thus, even when information from the day/night detecting device 1 indicates that the vehicle is in night-like conditions (i.e., the light switch ON signal), the day flag indicating that the vehicle is in day-like conditions remains on for a time equivalent to the first set value after the light switch ON signal is output. In other words, even when the day/night detection device detects a change from day to night, the night flag is not immediately turned on. Instead, there is a time delay equivalent to the first set value before the night flag is turned on.

As will be described in greater detail below, the wiping sensitivity is changed based on whether the day flag or the night flag is on. Thus, the delay described above allows for more accurate operation of the wiper.

Returning now to FIG. 7, when step S310 is answered negatively (i.e., the light switch is off and day-like conditions are detected), the subroutine proceeds to step S370. In step S370, a LIGHT ON counter is cleared. Thus, the time lapse after the signal is changed next time from OFF to ON can be counted with the LIGHT ON counter.

Next, in step S380, it is determined whether the count value on the LIGHT OFF counter is greater than or equal to a second set value. As mentioned above, the LIGHT OFF counter counts the time lapse since the light switch was turned off. That is, at step S380, it is determined whether the light has been off for a time equivalent to the second set value. When step S380 is answered affirmatively, the subroutine proceeds to Step S390, and the day flag indicating day-like conditions is turned on. When step S380 is answered negatively, the subroutine proceeds to step S400, and the count value on the LIGHT OFF counter is incremented. Then, the subroutine proceeds to step S410, and the night flag indicating night-like conditions remains on.

As mentioned above, even when the day/night detecting device 1 detects a change from night-like conditions to day-like conditions, the day flag is not immediately turned on. Instead, the controller 5 causes a time delay equal to the second set value before the day-flag is turned on.

Furthermore, when step S300 is answered affirmatively (i.e., the vehicle is stopped), the subroutine proceeds to step S420, and it is determined whether the light switch has been turned on. If step S420 is answered affirmatively (i.e., the light switch has been turned on), the subroutine proceeds to step S430, and the night flag is turned on. Then in step S440, the LIGHT ON counter is set to equal the first set value. In step S420 is answered negatively (i.e., the light switch has been turned off), the subroutine proceeds to Step S450, and the day flag is turned on. Then in step S460, the LIGHT OFF counter is set to the second set value.

As mentioned above, if the vehicle is stopped or nearly stopped, the corresponding day flag or night flag is immediately turned on without delay according to day/night information from the day/night detecting device 1. In other words, the controller 5 delays turning on the day or night flag except in cases where it is detected that the vehicle is stopped or nearly stopped. Then, the first set value is set for the LIGHT ON counter and the second set value is set for the LIGHT OFF counter so that the state of the flag does not change when the vehicle starts moving.

Referring again to FIG. 5, step S120 follows the input processing of step S110. Next, in step S120, the moisture quantity on the vehicle is detected. In one embodiment, the quantity of raindrops sticking to the windshield is detected based on the sensor output of the moisture sensor 2.

Figure 8:
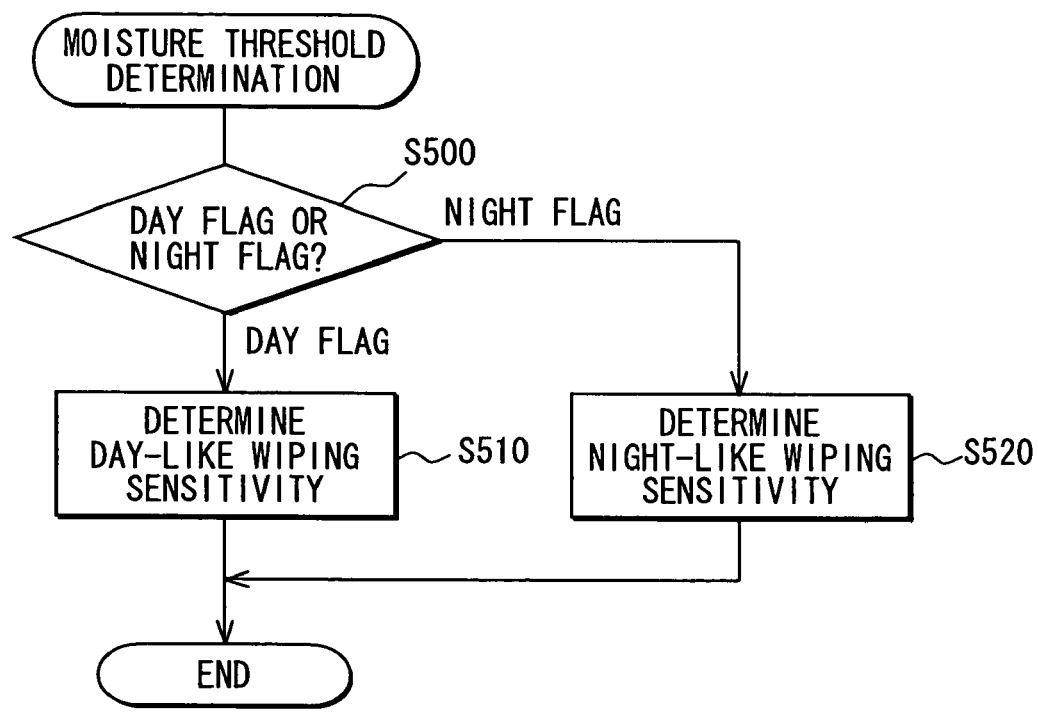
FIG. 8 is a flowchart illustrating a subroutine for operating the vehicle wiper control device.

Then, in step S130, moisture threshold determination processing is carried out. In this processing, a threshold moisture quantity is determined so as to vary the wiper wiping frequency according to the quantity of raindrops and the like. FIG. 8 illustrates one embodiment of the moisture threshold determination processing.

Beginning in step S500, it is determined whether the day flag or the night flag is on based on the day/night info processing described above (FIG. 7). If it is determined that the day flag is on, the subroutine proceeds to Step S510. Then, a threshold moisture value for daytime is determined according to the detected vehicle speed and the set sensitivity. Description will be given to an example of the relation between individual elements and threshold values. With respect to vehicle speed, the threshold value is adjusted so that the wiping frequency increases when the vehicle speed increases and decreases when the vehicle speed decreases. With respect to set sensitivity, the threshold value is adjusted so that the wiping frequency increases with a rise in sensitivity and decreases with a fall in sensitivity. Further, the threshold value is adjusted so that the wiping frequency is lower when the day flag is on than when the night flag is on. Based on this relation, a final threshold value is set with the state of each individual element taken into account.

When it is determined at step S500 that the night flag is on, the subroutine proceeds to step S520. Then, a threshold value for nighttime is determined according to the vehicle speed and the set sensitivity.

After a threshold moisture value is determined as mentioned above, the main routine proceeds to step S140 as shown in FIG. 5. Then, a wiping frequency with which the wiper is to be driven is determined based on the relationship between the quantity of moisture detected at step S120 and the threshold value determined at step S130.

Figure 9:
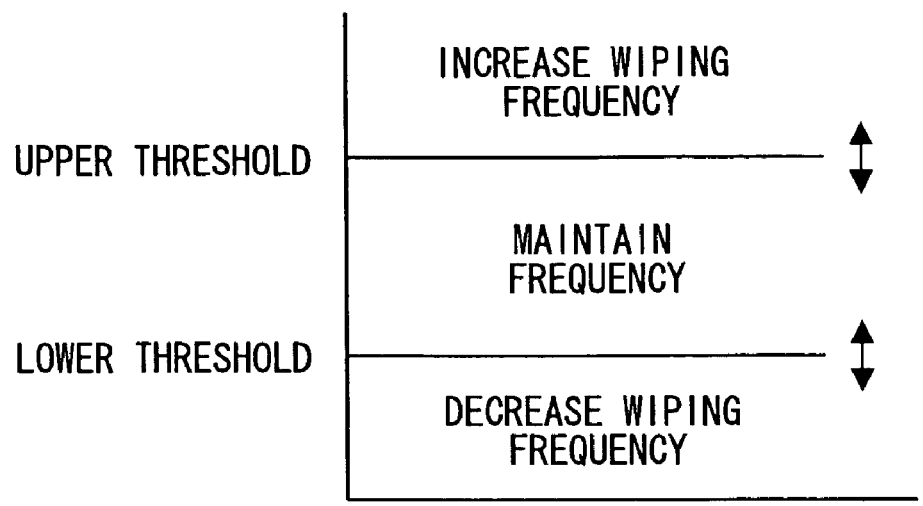
FIG. 9 is a graph illustrating operation of the vehicle wiper control device.

In one embodiment illustrated in FIG. 9, the threshold value determined at step S130 may include an upper threshold value and a lower threshold value for defining the range within which the present wiping frequency is maintained. In this case, the wiping frequency is adjusted by adjusting the upper threshold value and the lower threshold value. Thus, wiping action can be performed with a higher frequency, wiping frequency can be maintained, or wiping action can be performed with a lower frequency.

Figure 10:
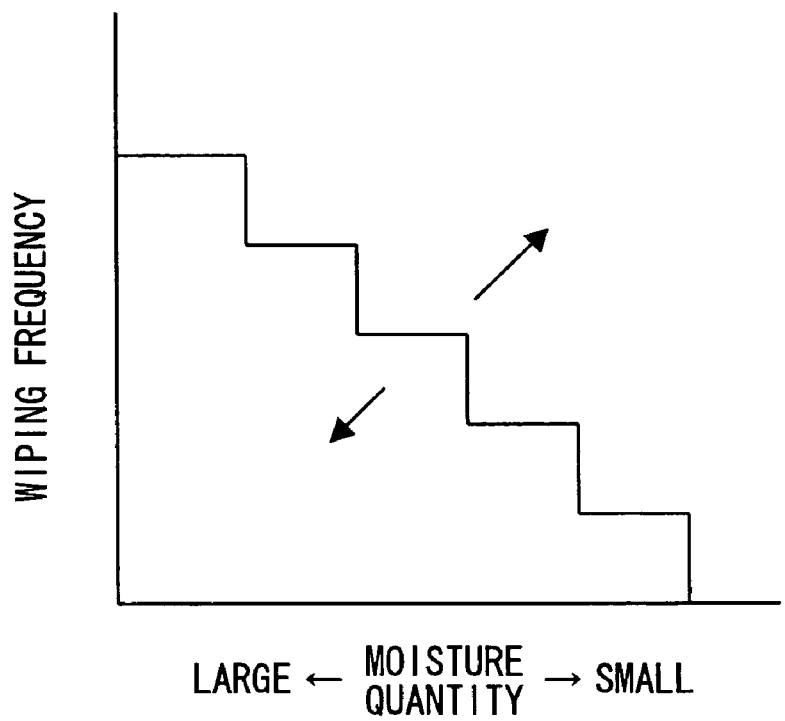
FIG. 10 is a graph illustrating another embodiment of operation of the vehicle wiper control device.

In an embodiment illustrated in FIG. 10, the threshold value may be so constructed that the quantity of moisture and the frequency of the wiping action of the wiper correspond with each other in multiple stages (represented by the stepped line in FIG. 10). In this case, the wiping frequency of the wiper can be varied by shifting the threshold value in the directions indicated by arrows in FIG. 10.

Figure 11A:
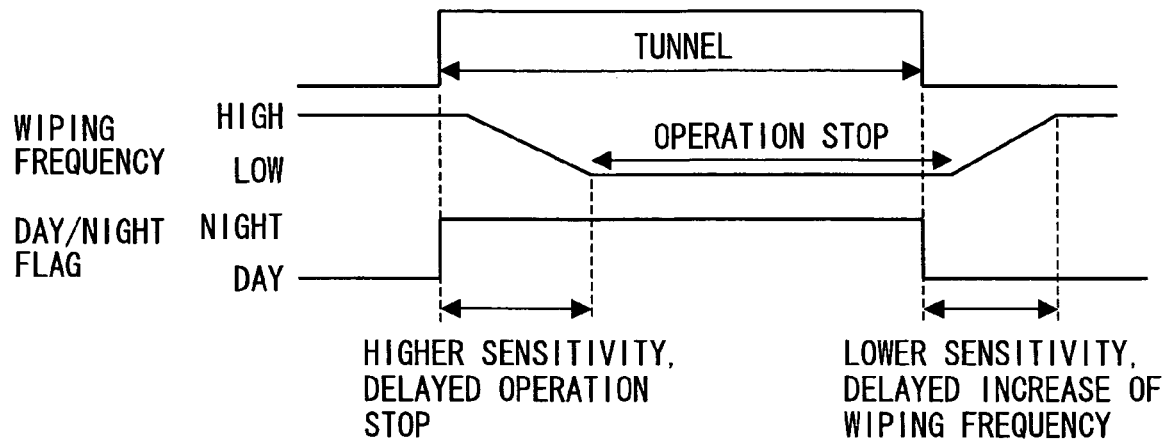
FIGS. 11A and 11B are graphs illustrating the operation of the vehicle wiper control device.
Figure 11B:
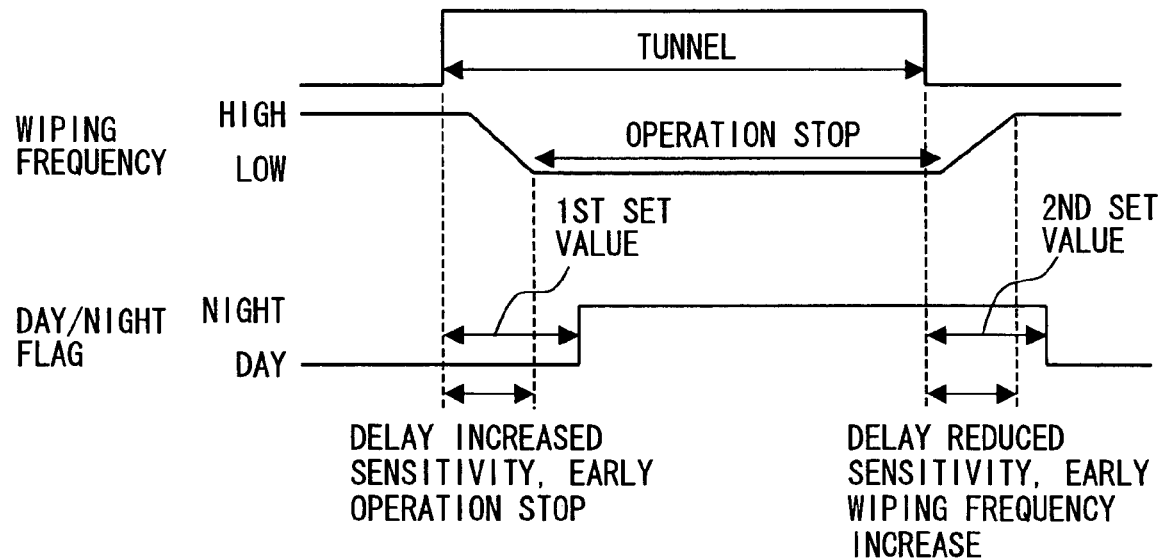

Description will be given to the action of the above-mentioned wiper wiping action control with reference to FIGS. 11A and 11B. FIGS. 11A and 11B both illustrate wiping action frequency changes due to the vehicle entering and exiting a tunnel. FIG. 11A illustrates change in the wiping frequency wherein the day flag or the night flag is turned on without delay. FIG. 11B illustrates change in the wiping frequency wherein the controller 5 delays turning on the day flag or the night flag.

In the case illustrated in FIG. 11A, when the vehicle enters the tunnel, the headlamps are turned on, and the night flag is immediately turned on. As a result, a night-like wiping threshold value is set as the moisture determination threshold value. As such, wiping action is maintained even with a smaller quantity of moisture. For this reason, even when the vehicle enters the tunnel and there is reduced moisture hitting the windshield (except for water from the roadway, from surrounding vehicles, etc.), the wiper is still likely to perform wiping action. Thus, it takes more time for the wiping action to stop.

However, as shown in FIG. 11B, when the controller 5 delays turning on the night or day flag, the wiping action of the wiper can be stopped earlier than in the case illustrated in FIG. 11A. Specifically, when the vehicle enters the tunnel, the day flag remains on for a time equivalent to the first set value. Therefore, the frequency of the wiping action of the wiper is determined using a day-like wiping threshold value, and the sensitivity is lower than with a night-like wiping threshold value.

When the vehicle exits the tunnel in the case illustrated in FIG. 11A, the day flag is immediately turned on. For this reason, the frequency of the wiping action of the wiper is determined with a threshold value for daytime, and the sensitivity is relatively low. Thus, it may take an undesirable amount of time before wiping action is performed with appropriate frequency.

However, when the controller 5 delays turning on the day flag as shown in FIG. 11B, the frequency of the wiping action can be raised to an appropriate level earlier than in the case illustrated in FIG. 11A. Specifically, when the vehicle exits the tunnel, the night flag remains on for a delay time equivalent to the second set value. Therefore, the wiping frequency of the wiper is determined with a night-like threshold value, and the sensitivity is relatively high.

Thus, the wiper control device allows for improved wiping performance. Also, the system has a relatively simple construction for added cost benefits.

In one embodiment, the first set value for the delay time is approximately equal to the time from when the vehicle enters a tunnel to when the wiping action is stopped. Thus, in this embodiment, the first set value for the delay time is between approximately five to ten seconds. In one embodiment, the second set value is also between approximately five to ten seconds. Thus, the delay time does not influence sensitivity adjustment processing carried out in places other than covered spaces.

It will be appreciated that description has been given to various embodiments of the invention. However, the invention is not limited to the above-mentioned embodiments, and various modifications may be made to the invention without departing from its scope.

An example will be taken. In the above-mentioned embodiment, the moisture threshold value is adjusted to change the wiping sensitivity. In another embodiment, the wiping sensitivity is adjusted by changing the moisture detection sensitivity of the moisture sensor 2. For instance, the moisture detection sensitivity is varied by changing the amount of emitted light in the light-emitting device, or the output level of the light sensitive device is changed versus the amount of light received.

The present invention has been described in an illustrative manner. It is to be understood that the terminology used is intended to be in the nature of words of description rather than of limitation. Many modifications and variations of the present invention are possible in light of the above teachings. Therefore, within the scope of the appended claims, the present invention may be practiced other than as specifically described.

What is claimed is:

1. A wiper control device for a vehicle with a wiper, said wiper control device comprising:
    a day/night detecting device for detecting whether the vehicle is in day-like conditions or night-like conditions;
    a moisture detection device that detects a quantity of moisture on the vehicle; and
    a controlling device that controls the wiping action of the wiper based on wiping sensitivity to the quantity of moisture detected by the moisture detection device,
    wherein the controlling device adjusts the wiping sensitivity between night-like wiping sensitivity and day-like wiping sensitivity,
    wherein the controlling device adjusts wiping sensitivity to night-like wiping sensitivity when the day/night detecting device detects night-like conditions,
    wherein the controlling device adjusts wiping sensitivity to day-like wiping sensitivity when the day/night detecting device detects day-like conditions,
    wherein the day-like wiping sensitivity is lower than the night-like wiping sensitivity,
    wherein wiping frequency increases with a rise in wiping sensitivity and decreases with a fall in wiping sensitivity, and
    wherein, when the day/night detecting device detects a change between day-like and night-like conditions, under at least some predetermined condition, the controlling device delays switching between night-like and day-like wiping sensitivity for a predetermined delay time.

2. The wiper control device according to claim 1, further comprising:
    a speed detecting device that detects running speed of the vehicle, and
    wherein the controlling device delays switching between night-like and day-like wiping sensitivity except when the running speed of the vehicle is below a predetermined amount.

3. The wiper control device according to claim 1, wherein, when the day/night detecting device detects a change from day-like conditions to night-like conditions, the controlling device delays switching from day-like wiping sensitivity to night-like wiping sensitivity for a first delay time.

4. The wiper control device according to claim 1, wherein, when the day/night detecting device detects a change from night-like conditions to day-like conditions, the controlling device delays switching from night-like wiping sensitivity to day-like wiping sensitivity for a second delay time.

5. The wiper control device according to claim 1, wherein the predetermined delay time is in a range equal to or between five to ten seconds.

6. The wiper control device according to claim 1, wherein:
the day/night detecting device detects whether the vehicle is in day-like conditions and whether the vehicle is in night-like conditions according to a light switch,
the day/night detecting device detects that the vehicle is in day-like conditions when the light switch is off, and
the day/night detecting device detects that the vehicle is in night-like conditions when the light switch is on.

7. The wiper control device according to claim 1, wherein the wiping frequency is a number of times of wiping per unit time.

8. A method for controlling a vehicular windshield wiper, said method comprising:
detecting whether the vehicle is in day-like conditions or night-like conditions;
detecting a quantity of moisture on the vehicle; and
controlling the wiping action of the wiper based on wiping sensitivity to the quantity of detected moisture,
wherein the controlling step adjusts the wiping sensitivity between night-like wiping sensitivity and day-like wiping sensitivity,
wherein the controlling step adjusts wiping sensitivity to night-like wiping sensitivity when the day/night detecting device detects night-like conditions,
wherein the controlling step adjusts wiping sensitivity to day-like wiping sensitivity when the day/night detecting device detects day-like conditions;
wherein the day-like wiping sensitivity is lower than the night-like wiping sensitivity,
wherein wiping frequency increases with a rise in wiping sensitivity and decreases with a fall in wiping sensitivity, and
wherein when the detecting step detects a change between day-like and night-like conditions, under at least some predetermined condition, the controlling step delays switching between night-like and day-like wiping sensitivity for a predetermined delay time.

9. The method of claim 8, further comprising:
detecting running speed of the vehicle; and
wherein the controlling step delays switching between night-like and day-like wiping sensitivity except when the running speed of the vehicle is below a predetermined amount.

10. The method of claim 8, wherein, when the detecting step detects a change from day-like conditions to night-like conditions, the controlling step delays switching from day-like wiping sensitivity to night-like wiping sensitivity for a first delay time.

11. The method of claim 8 wherein, when the detecting step detects a change from night-like conditions to day-like conditions, the controlling step delays switching from night-like wiping sensitivity to day-like wiping sensitivity for a second delay time.

12. The method of claim 8, wherein the predetermined delay time is in a range equal to or between five to ten seconds.

13. The method of claim 8, wherein:
the detecting step detects whether the vehicle is in day-like conditions and whether the vehicle is in night-like conditions according to a light switch,
the detecting step detects that the vehicle is in day-like conditions when the light switch is off, and
the detecting step detects that the vehicle is in night-like conditions when the light switch is on.

14. The method of claim 8, wherein the wiping frequency is a number of times of wiping per unit time.

* * * * *